(12) United States Patent
Gupta et al.

(10) Patent No.: US 10,747,596 B2
(45) Date of Patent: Aug. 18, 2020

(54) DETERMINING WHEN TO SEND MESSAGE TO A COMPUTING NODE TO PROCESS ITEMS USING A MACHINE LEARNING MODULE

(71) Applicant: INTERNATIONAL BUSINESS MACHINES CORPORATION, Armonk, NY (US)

(72) Inventors: Lokesh M. Gupta, Tucson, AZ (US); Kevin J. Ash, Tucson, AZ (US); Matthew G. Borlick, Tucson, AZ (US); Kyler A. Anderson, Sahuarita, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/050,725

(22) Filed: Jul. 31, 2018

(65) Prior Publication Data
US 2020/0042367 A1    Feb. 6, 2020

(51) Int. Cl.
*G06F 3/00* (2006.01)
*G06F 9/44* (2018.01)
*G06F 9/46* (2006.01)
*G06F 13/00* (2006.01)
*G06F 9/54* (2006.01)
(Continued)

(52) U.S. Cl.
CPC .............. *G06F 9/546* (2013.01); *G06F 3/061* (2013.01); *G06F 3/0631* (2013.01); *G06N 20/00* (2019.01); *G06F 3/0679* (2013.01)

(58) Field of Classification Search
CPC ...................................................... G06F 9/546
USPC .......................................................... 719/313
See application file for complete search history.

(56) References Cited

U.S. PATENT DOCUMENTS

| | | |
|---|---|---|
| 5,442,730 A | 8/1995 | Bigus |
| 8,478,945 B2 | 7/2013 | Ash et al. |
| 9,262,321 B2 | 2/2016 | Benhase et al. |

(Continued)

OTHER PUBLICATIONS

N. Xiong, et al., "An adaptive and predictive approach for autonomic multirate multicast networks," ACM Transactions on Autonomous and Adaptive Systems (TAAS) TAAS Homepage archive, vol. 6 Issue 3, Article No. 22. (Sep. 2011).

(Continued)

*Primary Examiner* — Timothy A Mudrick
(74) *Attorney, Agent, or Firm* — David W. Victor; Konrad Raynes Davda & Victor LLP

(57) ABSTRACT

Provided are a computer program product, system, and method for determining when to send message to a computing node to process items using a machine learning module. A send message threshold indicates a send message parameter value for a send message parameter indicating when to send a message to the computing node with at least one requested item to process. Information related to sending of messages to the computing node to process requested items is provided to a machine learning module to produce a new send message parameter value for the send message parameter indicating when to send the message, which is set to the send message parameter value. A message is sent to the computing node to process at least one item in response to the current value satisfying the condition with respect to the send message parameter value.

18 Claims, 10 Drawing Sheets

(51) Int. Cl.
   *G06F 3/06* (2006.01)
   *G06N 20/00* (2019.01)

(56) References Cited

U.S. PATENT DOCUMENTS

| | | | |
|---|---|---|---|
| 9,665,492 | B2 | 5/2017 | Ash et al. |
| 9,747,040 | B1* | 8/2017 | Balakrishnan ........ G06F 3/0611 |
| 9,870,323 | B2 | 1/2018 | Benhase et al. |
| 2013/0198461 | A1* | 8/2013 | Ash .................... G06F 12/0866 |
| | | | 711/133 |

OTHER PUBLICATIONS

S. Rajbhandari, et al., "Optimizing CNNs on Multicores for Scalability, Performance and Goodput," ASPLOS 17 Proceedings of the Twenty-Second International Conference on Architectural Support for Programming Languages and Operating Systems, pp. 267-280 (Apr. 2017).
List of IBM Patents or Patent Applications Treated as Related, filed Jul. 31, 2018, Total 2 pp.
U.S. Appl. No. 16/050,755, filed Jul. 31, 2018.
Response to Office Action 1 for U.S. Appl. No. 16/050,755, dated Nov. 19, 2019, 13 pp.
Notice of Allowance 1 for U.S. Appl. No. 16/050,755, dated Dec. 13, 2019, 11 pp.
Office Action 1 for U.S. Appl. No. 16/050,755, dated Sep. 16, 2019, 14 pp.

* cited by examiner

Cache Control Block

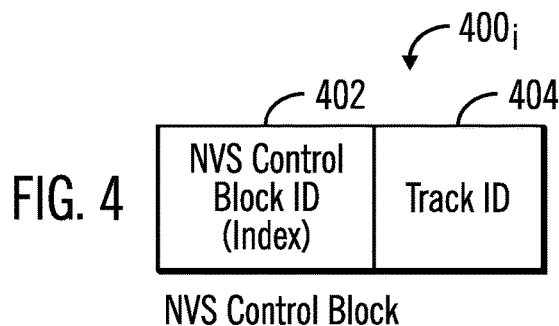
FIG. 4  NVS Control Block
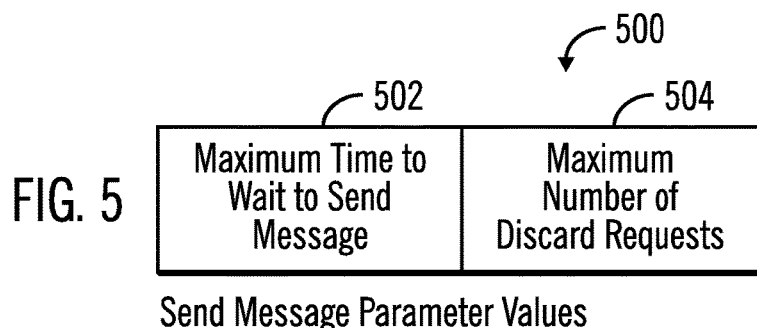
FIG. 5  Send Message Parameter Values
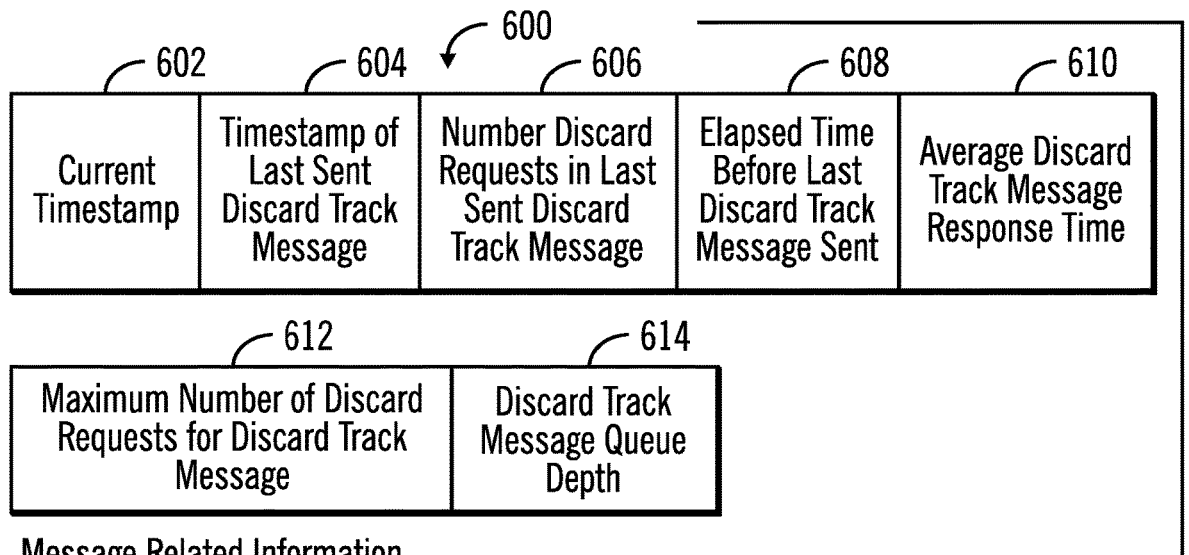
Message Related Information
FIG. 6
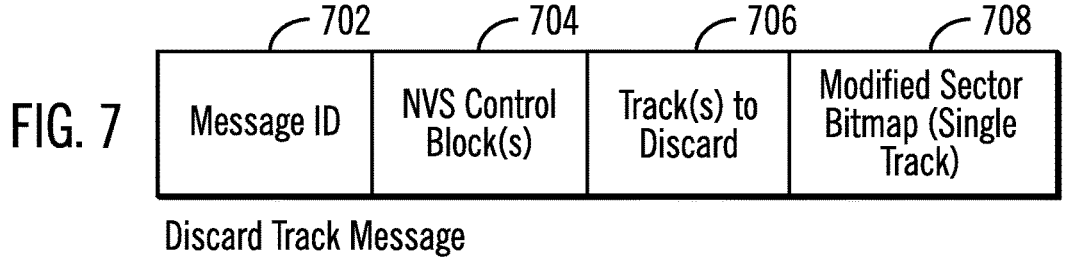
FIG. 7  Discard Track Message

DETERMINING WHEN TO SEND MESSAGE TO A COMPUTING NODE TO PROCESS ITEMS USING A MACHINE LEARNING MODULE

BACKGROUND OF THE INVENTION

1. Field of the Invention

The present invention relates to a computer program product, system, and method for determining when to send message to a computing node to process items using a machine learning module.

2. Description of the Related Art

In a storage system, a storage controller may store tracks from a storage in a cache to improve read performance for the tracks by making available in a cache that has better performance over the storage. The storage system may also store a backup copy of a modified track in the cache that has not yet been destaged to the storage in a non-volatile storage ("NVS") to provide a redundant copy for recovery if the modified track is corrupted in the cache. When a modified track is destaged from the cache to the storage to free space in the cache for further tracks, a discard track message is sent to discard the destaged track from the NVS. Each discard track message may indicate one or more tracks destaged in the cache to discard from the NVS.

When a discard single track method is used, each mail message contains additional information to perform congruency checking between the copy of the modified track in the cache and in the NVS. When a discard multi track method is used, each message indicates multiple tracks to remove. In a discard multi track message, only the track identifier and track location are contained in the message data. In order to improve performance while host Input/Output (I/O) activity is high, the first discard track request is queued and then additional discard track requests (up to 20) are gathered for a time period, such as one millisecond. Once some maximum amount of requests (e.g., 20) have occurred or after one millisecond has passed since queuing the first discard request, then a discard single message is sent if only one discard request is queued or a discard multi message is sent if more than one discard request is queued.

There is a need in the art for improved techniques to determine when to send a message, such as a discard track message, to a computing node.

SUMMARY

Provided are a computer program product, system, and method for determining when to send message to a computing node to process items using a machine learning module. A send message threshold indicates a send message parameter value for a send message parameter indicating when to send a message to the computing node with at least one requested item to process. Information related to sending of messages to the computing node to process requested items is provided to a machine learning module. A new send message parameter value for the send message parameter indicating when to send the message is received from the machine learning module having processed the provided information. The send message parameter value is set to the new send message parameter value. A determination is made as to whether a current value of the send message parameter satisfies a condition with respect to the send message parameter value. A message is sent to the computing node to process at least one item in response to the current value satisfying the condition with respect to the send message parameter value.

The above embodiment improves computer technology for determining when to send a message to a computing node, such as a discard track message, by providing a send message threshold indicating a send message parameter value for a send message parameter indicating when to send a message. The send message parameter values used to determine when to send messages are calculated based on current message related information and performance information in the system to optimize send message operations.

In a further embodiment, the message comprises a discard track message sent to the computing node to discard a track from a non-volatile storage at the computing node in response to destaging the track from a cache to a storage, and wherein the message related information includes information on sending of discard track messages sent to the computing node to discard tracks from the non-volatile storage.

In a further embodiment, the send message parameter value indicating when to send the discard track message comprises at least one of a maximum time to wait for sending a discard track message and a maximum number of discard track requests for tracks to discard from the non-volatile storage to include in the discard track message.

In a further embodiment, a discard track request is queued in a discard request queue for each track destaged from the cache. The sending the discard track message in response to the current value satisfying the condition with respect to the send message parameter value from the machine learning module comprises at least one of: sending a discard track message indicating tracks to discard in discard track requests in the queue in response to a time since a last sent discard track message was sent comprising at least the maximum time to wait for sending the discard track message; and sending a discard track message indicating tracks to discard in discard track requests in the queue in response to a number of discard requests in the queue comprising at least the maximum number of discard requests.

With the above embodiment, the sending of a discard track message is improved by using a maximum time to wait and a number of discard requests in the queue provided by the machine learning module to determine when to send the discard track message to optimize performance. The send message parameter values used to determine when to send messages are calculated based on current message related information and performance information in the system to optimize the send message operations effect on system performance.

In a further embodiment, the information related to sending of discard track messages, provided to the machine learning module, comprises a plurality of: a timestamp when a last discard track message was sent; a current timestamp; a number of discard requests in a last sent discard track message; an elapsed time before the last sent discard track message was sent; an average discard track message response time during a time interval; a maximum number of discard requests to include in a discard track message; and a discard track message queue depth indicating sent discard track messages for which complete has not been returned.

In a further embodiment, a discard track request is queued in a discard request queue for each track destaged from the cache. A discard track message is generated indicating at least one track indicated in each discard request in the discard request queue in response to determining that the current value for the send message parameter satisfies a condition with respect to the send message parameter value from the machine learning module, wherein the sent discard track message comprises the generated discard track message.

With the above embodiment, the optimized parameters including the send message parameter value are used to determine when to generate the discard track message to send to discard tracks from the non-volatile storage to have the sending of the discard track message optimize performance in the system.

In a further embodiment, the providing the information related to the sending of discard track messages to the machine learning module is performed in response to at least one of sending the discard track message and receiving a response to a discard track message.

With the above embodiment, the machine learning module is provided information to generate the send message parameter values after sending a discard track message and receiving a response to a discard track message to provide optimized send message parameter values based on current operating conditions for use in determine when to send a next discard track message. Generating the new send message parameter values provides further optimization for the next decisions of when to generate and send a discard track message.

In a further embodiment, the cache from which tracks are destaged is in a first computing node and wherein the computing node comprises a second computing node. The discard track message is sent from the first computing node to the second computing node. A response to a sent discard track message is received from the second computing node and the information is updated related to the sending of the discard track messages in response to receiving the response to the sent discard track message.

With the above embodiment, the information provided to the machine learning module is updated upon receiving a response to a discard track message to provide the information current and up-to-date, so the machine learning module determination of the send message parameter values is based on current information.

BRIEF DESCRIPTION OF THE DRAWINGS

FIG. 4 illustrates an embodiment of non-volatile storage control block.

FIG. 5 illustrates an embodiment of send message parameter values.

FIG. 6 illustrates an embodiment of message related information.

FIG. 7 illustrates an embodiment of a discard track message.

DETAILED DESCRIPTION

Figure 1:
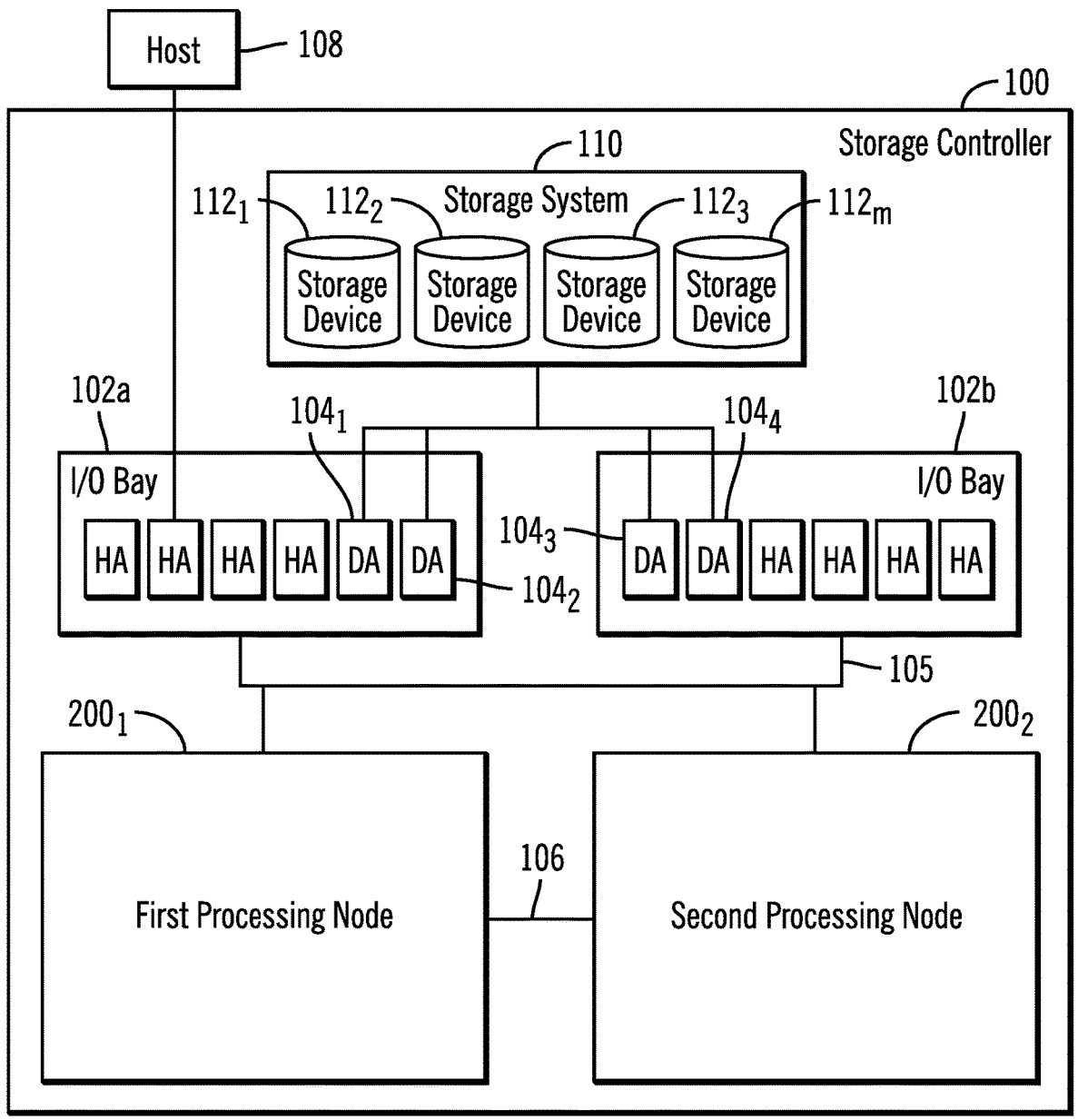
FIG. 1 illustrates an embodiment of a computing environment.

In current systems that use multi or single discard track messages to discard destaged modified tracks from a non-volatile storage, a cache scan waits for the discard track message to complete processing before continuing. The response time for a discard track message is negatively impacted if the frequency of sending the discard track messages is low. On the other hand if discard is for a destage, destage completion does not wait for message processing, but instead queues the message and then continues. A single track discard message created for each destage completion will use substantially more processor resources and take longer than if only one multi discard track message is sent indicating multiple tracks to discard. There is a need in the art to balance message response time and processor utilization when sending discard track messages.

Described embodiments improve computer technology for determining when to send a message to a computing node, such as a discard track message, by providing a send message threshold indicating a send message parameter value for a send message parameter indicating when to send a message. Information related to sending of messages, such as discard track messages, is provided to a machine learning module and, in response, the machine learning module provides a new send message parameter value indicating when to send the message that is optimized based on the current input and message related information. The message is then sent when a current value for a send message parameter satisfies a condition with respect to the send message parameter value, such as a maximum time to wait for sending a discard track message and/or a maximum number of discard track requests for tracks to discard from the non-volatile storage to include in the discard track message. In this way, the send message parameter values used to determine when to send messages are calculated based on current message related information and performance information in the system to optimize send message operations.

Further embodiments provide improvements to computer technology for determining when to send a message by adjusting the send message parameter value based on a performance condition and a performance condition threshold to produce an adjusted send message parameter value that is adjusted based on a margin of error with respect to the performance condition threshold. The performance condition threshold may comprise a message processing time performance and processor utilization. The machine learning module is retrained with the input information related to the sending of messages to produce the adjusted send message parameter value to produce for the current input conditions the send message parameter value that is adjusted to remove a margin of error. In this way, the machine learning module is continually retrained to produce more accurate send message parameter values based on current operating conditions and message related information and statistics, to better balance having more frequent messages to improve the discard response time or having less frequent messages to reduce processor utilization to process the messages.

FIG. 1 illustrates an embodiment of a storage controller 100 including a plurality of independent processing nodes $200_1$, $200_2$, such as a central electronics complex (CEC), that each connect to Input/Output (I/O) bays 102a, 102b having device adaptors (DA) $104_1$, $104_2$, $104_3$, $104_4$, also referred to as storage adaptors, and host adaptors (HA) therein, over a bus interface 105, such as a Peripheral Component Interconnect Express (PCIe) bus. The processing nodes $200_1$, $200_2$ may also communicate with each other directly over a link 106, such as a PCIe bus. Host systems, such as host 108, may connect to the storage controller 100 through a host adaptor (HA) in the I/O bays 102a, 102b.

A storage system 110 includes a plurality of storage devices $112_1$ . . . $112_m$, in which tracks, logical volumes, ranks of logical contiguous storage spaces, and storage arrays, such as Redundant Arrays of Independent Disks (RAID), may be configured. Each processing node $200_1$, $200_2$ may be assigned one of the device adaptors in each of the I/O bays 102a, 102b that connect to the storage array 110 to provide access to data configured in the storage devices 112. Each processing node $200_1$, $200_2$ has a default configuration to communicate with a device adaptor (DA) $104_1$, $104_2$, $104_3$, $104_4$ in one of the I/O bays 102a, 102b, where the default configuration will assign the different processing nodes $200_1$, $200_2$ to device adaptors in the I/O bays 102a, 102b.

In the embodiment of FIG. 1, two redundant processing nodes $200_1$, $200_2$ and two I/O bays 102a, 102b are shown. In further embodiments, there may be more than the number of shown redundant elements $200_1$, $200_2$, 102a, 102b, to provide additional redundancy. Alternatively, there may be only one processing node in the system.

The storage controller 100 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world).

The storage devices $112_1$, . . . $112_m$ in the storage system 110 may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Storage arrays may further be configured ranks in the storage devices $112_1$ . . . $112_m$, such as Just a Bunch of Disks (JBOD), Direct Access Storage Device (DASD), Redundant Array of Independent Disks (RAID) array, virtualization device, etc. Further, the storage devices $112_1$ . . . $112_m$ in the storage 110 may comprise heterogeneous storage devices from different vendors and different types of storage devices, such as a first type of storage devices, e.g., hard disk drives, that have a slower data transfer rate than a second type of storage devices, e.g., SSDs.

Figure 2:
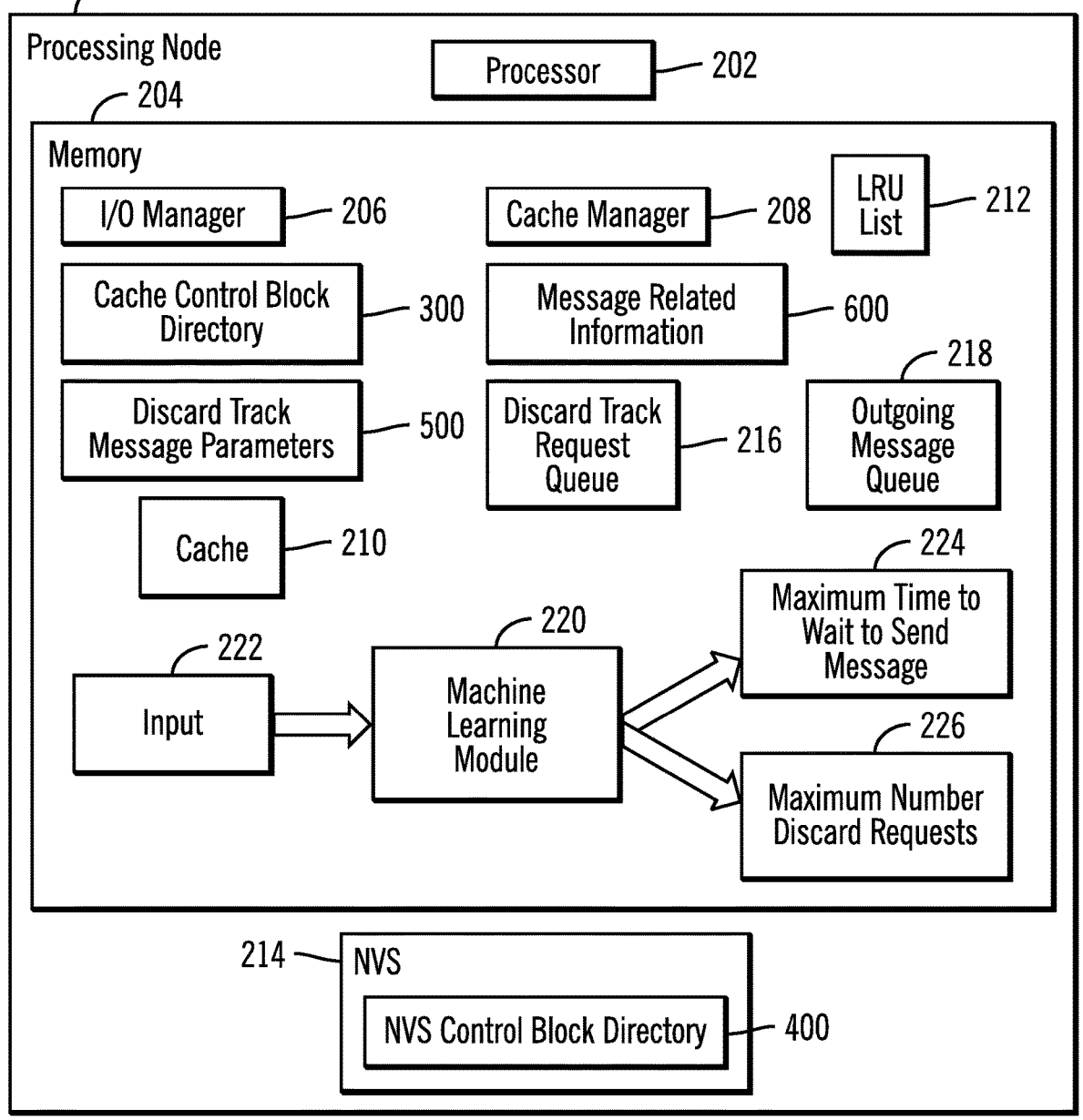
FIG. 2 illustrates an embodiment of a processing node.

FIG. 2 illustrates an embodiment of a processing node $200_1$, such as one of the processing nodes $200_1$, $200_2$, including a processor 202, such as one or more processor devices, and a memory 204 having program code executed by the processor 202. The memory 204 includes an I/O manager 206 and cache manager 208. The I/O manager 206 manages access requests from internal processes in the computing system 100 and/or from hosts 108 for tracks in the storage 110. The cache manager 208 maintains modified tracks in a cache 210. A track may comprise any unit of data configured in the storage 110, such as a track, Logical Block Address (LBA), etc., which is part of a larger grouping of tracks, such as a volume, logical device, etc. Each processing node $200_1$, $200_2$ may be assigned groups of the storage arrays configured in the storage devices $112_1$ . . . $112_m$.

The cache manager 208 maintains a cache control block directory 300 and a Least Recently Used (LRU) list 212 for tracks in the cache 210. The control block directory 300 includes the cache control blocks, where there is one cache control block for each track in the cache 210 providing metadata on the track in the cache 210. Upon determining that the LRU list 212 is full or has reached a threshold level, the cache LRU list 212 is used to determine tracks to evict from the cache 210. When a track is modified in the cache 210 in node $200_i$, a copy of the modified track is copied to a non-volatile storage device ("NVS") 214 in the other node $200_j$ to maintain a backup copy of the track on another node for redundancy. When a track is destaged from the cache 210 to the storage 110 using the LRU list 212, then the cache manager 208 in node $200_i$ sends a discard track request message 700 (FIG. 7) to the other node $200_j$ to discard the track from the NVS 214 in the node $200_j$ to free up space in the NVS 214 to backup further modified tracks in the cache 210 in node $200_i$. The NVS 214 stores a non-volatile storage (NVS) control block directory 400 having information on tracks stored in the NVS 214.

The memory 204 further includes a discard track request queue 216 including a discard track request added by the cache manager 208 for a modified track destaged from the cache 210 to cause the destaged track to be discarded from the NVS 214 in the other node $200_j$. The memory 204 also includes an outgoing message queue 218 to which a discard track message 700 is indicated when sent.

The memory 204 also maintains send message parameter values 500 and message related information 600. The send message parameter values 500 inform the cache manager 208 when to generate a discard track message 700 (FIG. 7), such as based on the number of queued discard track requests in the queue 216 or a time since a last discard track message 700 was sent. The message related information 600 includes statistics gathered on operating conditions in the node $200_i$ and on discard track message processing.

The memory 204 includes a machine learning module 220 that receives as input 222 message related information 600 and computes output comprising a maximum time to wait to send a discard track message 224 and a maximum number of discard requests 226 to queue before sending a discard track message 700. The machine learning module 220 implements a machine learning technique such as decision tree learning, association rule learning, artificial neural network, inductive programming logic, support vector machines, Bayesian models, etc. The arrows shown from the input 222 to the machine learning module 220 and to the outputs 224, 226 illustrate a flow of data to and from the machine learning module 220 and not actual structures in the memory 204.

In one embodiment, the machine learning module 220 may comprise an artificial neural network program. The neural network is trained using backward propagation to adjust weights and biases at nodes in a hidden layer to produce the maximum time to wait to send a message and a maximum number of discard requests to queue. The machine learning module 220 is trained to produce a maximum time to wait to send a message 224 and a maximum number of discard requests 226 that optimizes operations at the nodes $200_i$, $200_j$. For instance, if computational resource utilization is too high at node $200_i$ or if the other node $200_j$ response time to discard track messages is slow, indicating the other node $200_j$ may be over utilized and less able to devote resources to processing discard track messages 700, then the machine learning module 200 may be trained based on current message related information 600 to calculate the parameters 224 and 226 to send discard track messages less frequently to reduce resource burdens on both nodes $200_i$, $200_j$. On the other hand, if computational resource utilization is low at node $200_i$ or if the other node $200_j$ response time to discard track messages is fast, indicating the other node $200_j$ may be underutilized and capable of directing more resources to processing discard track messages 700, then the machine learning module 200 may be trained based on current message related information 600 to calculate the parameters 224 and 226 to send discard track messages more frequently to improve the processing of discard track requests and destage operations.

In backward propagation used to train a neural network machine learning module, margin of errors are determined based on operational parameters, such as a threshold discard track message processing time minus an experienced average discard track message processing time and a threshold percentage processor utilization minus a current experienced percentage processor utilization, and biases at nodes in the hidden layer are adjusted accordingly to decrease the margins of error in these measured storage parameters. Backward propagation may comprise an algorithm for supervised learning of artificial neural networks using gradient descent. Given an artificial neural network and an error function, the method may calculate the gradient of the error function with respect to the neural network's weights and biases.

Although FIG. 2 shows one machine learning module 220, there may be separate machine learning module 220 for each RAID rank, or other storage unit, configured in the storage 110 or one machine learning module for all the ranks, or one or more storage units configured in the storage 110.

The I/O manager 206, cache manager 208, and machine learning module 220 are shown in FIG. 2 as program code loaded into the memory 204 and executed by the processor 202. Alternatively, some or all of the functions may be implemented in hardware devices in the processing nodes $200_1$, $200_2$, such as in Application Specific Integrated Circuits (ASICs) or executed by separate dedicated processors.

The memory 204 and cache 210 may comprise one or more memory devices, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and a Non-Volatile Direct In-Line Memory Modules (DIMMs) with byte-addressable write-in-place memory, etc. The non-volatile storage ("NVS") 214 may comprise a non-volatile storage, such as NAND storage, e.g., flash memory, Solid State Drive (SSD) storage, non-volatile RAM, etc. Other non-volatile devices may be used for the non-volatile storage 214, such as a battery backed-up DIMM.

Figure 3:
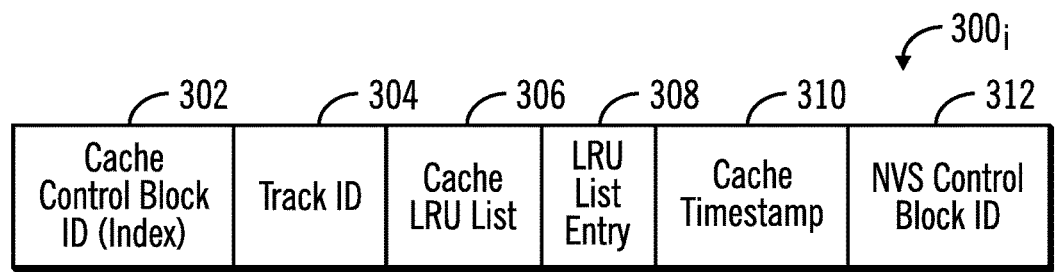
FIG. 3 illustrates an embodiment of a cache control block.

FIG. 3 illustrates an embodiment of a cache control block $300_i$ for one of the tracks in the cache 210, including, but not limited to, a cache control block identifier 302, such as an index value of the cache control block $300_i$; a track ID 304 of the track in the storage 110; the cache LRU list 306 in which the cache control block $300_i$ is indicated; an LRU list entry 308 at which the track is indicated; a cache timestamp 310 indicating a time the track was added to the cache 210 and indicated on the LRU list 306; and an NVS control block identifier 312 indicating an NVS control block in the NVS control block directory 400 for the NVS 214 in which the modified track is backed-up.

FIG. 4 illustrates an embodiment of an NVS control block $400_i$ in the NVS control block directory 400 for one of the modified tracks backed-up in the NVS 214, and includes an a NVS control block identifier 402, such as an index value of the NVS control block $400_i$ and a track ID 404 of the track in the storage 110 being backed-up in the NVS 214.

FIG. 5 illustrates an embodiment of the send message parameter values 500 that are initialized to some predetermined value and subsequently updated with output from the machine learning module 220, and includes a maximum time to wait to send a message 502 and maximum number of discard track requests 504 that are queued in the queue 216 before a discard track message 700 is sent.

FIG. 6 illustrates an embodiment of message related information 600 that is gathered during message operations, including system operational parameters and message related statistics, that are used as the input 222, including a current timestamp 602, which may be provided by a system clock in the processing node $200_i$ gathering the information 600; a timestamp of the last sent discard track message 604; a number of discard requests in the last sent discard track message 606; an elapsed time before last discard track message sent 608; an average discard track message response time 610, gathered during a time interval, and updated each response to a discard track message 700 is received from the receiving node $200_j$; a maximum number of discard requests for a discard track message 612 that can be included in the message 700; and a discard track message queue depth 614, indicating a number of queued discard track messages in the queue 216.

The message related information 600 may impact the maximum time to wait 224 and maximum number of discard requests 226 that the machine learning module 220 outputs. For instance, a relatively large differential of the current timestamp 602 and the timestamp of the last sent discard track message 606 indicates to expedite the sending of the message, i.e., higher message frequency, by reducing the maximum time to wait 224 and the maximum number of discard requests 226. A relatively high number of discard requests 606 in the last message indicates to decrease the maximum number of discard requests 226 to cause the message 700 to be sent more frequently to reduce the relatively high number of discard requests 606. Similarly a relatively low number of discard requests 606 will indicate to increase the maximum number of discard requests 226 to cause the message 700 to be sent less frequently to increase the relatively low number of discard requests 606 and reduce message processing burdens on the node $200_i$ processing the messages. A relatively high average discard track message response time 610 indicates the receiving node $200_j$ may be overburdened, which indicates to reduce the frequency of the messages 700 by increasing maximum time to wait 224 and maximum number of discard requests 226. Similarly, a relatively low average discard track message response time 610 indicates the receiving node $200_j$ may be underutilized, which indicates to increase the frequency of the messages 700, to improve the response time to discard messages, by decreasing the maximum time to wait 224 and decreasing the maximum number of discard requests 226 to send more messages 700 to improve the completion time of the destage operation, which is linked to completing the discard track operation from the NVS 214. Increasing the message frequency further increases the rate at which tracks are discarded from the NVS 214, which has the advantage of freeing up space in the NVS 214 at a faster rate. A relatively high queue depth 614 indicates that the remote node $200_j$ may be overburdened and delaying processing the discard track messages 700, which indicates to increase the maximum time to wait 224 and maximum number of discard requests 226 to reduce the frequency at which messages are sent. Similarly, a relatively low queue depth 614 indicates that the remote node $200_j$ may be underutilized and have more availability to process the discard track messages 700, which indicates to increase the frequency of sending messages 700 by reducing the maximum time to wait 224 and reducing the number of discard requests 226.

FIG. 7 illustrates an embodiment of a discard track message 700 as including a message identifier (ID) 702, one or more NVS control blocks 704 of tracks in NVS 214 to discard; the track IDs 706 of one or more tracks to discard; and for messages only indicating one track to discard, a modified sector bitmap 708 indicating the sectors that are modified and may be used to validate the track in the NVS 214 to verify that the copy of the track in the NVS 214 has the same sectors modified as indicated in the bitmap 708.

Figure 8:
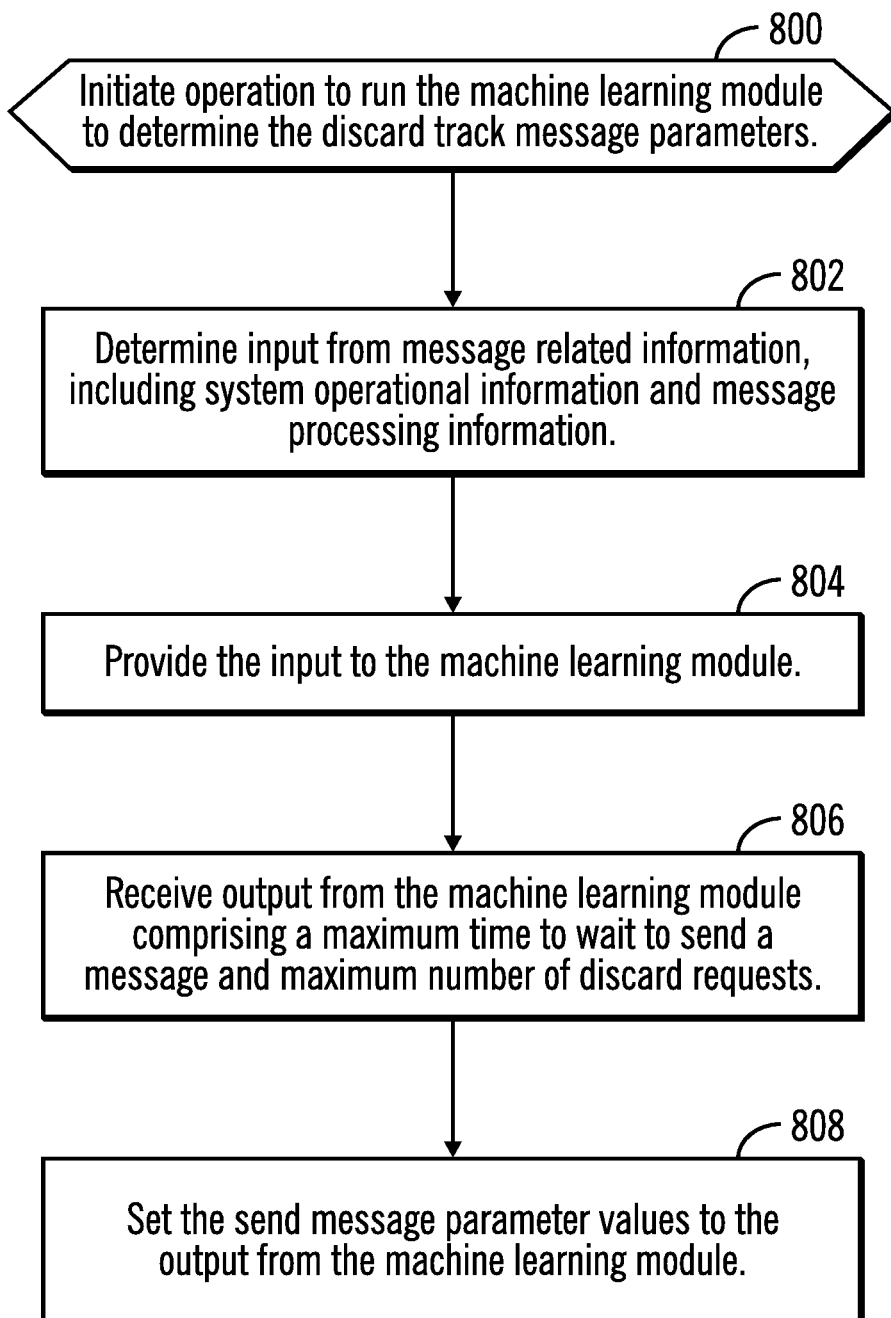
FIG. 8 illustrates an embodiment of operations to use a machine learning module to calculate the send message parameter values used to control the frequency of generating discard track messages.

FIG. 8 illustrates an embodiment of operations performed by the machine learning module 220 invoked by the cache manager 208 or other component to calculate the maximum time to wait to send a message 502 and maximum number of discard requests 504 to include in a message 700. The machine learning module 220 may be invoked to update the send message parameter values 500 when a discard track message 700 is sent or upon receiving a response to a sent discard track message 700. Upon initiating (at block 800) an operation to run the machine learning module 220 to determine the send message parameter values 500, input 222 is determined (at block 802) from the message related information 600 including message processing statistics. The input 222 is provided (at block 804) to the machine learning module 220. The cache manager 208 receives (at block 806) as output 224, 226 from the machine learning module 220 the maximum time to wait to send a message 224 and a maximum number of discard requests 226. The send message parameter values 502, 504 are set (at block 808) to the machine learning module 220 output 224, 226, respectively.

In this way the determination of the send message parameter values 502, 504 used to determine when to send a message is set to optimal values based on current message related information, such as message statistics existing in the system.

Figure 9:
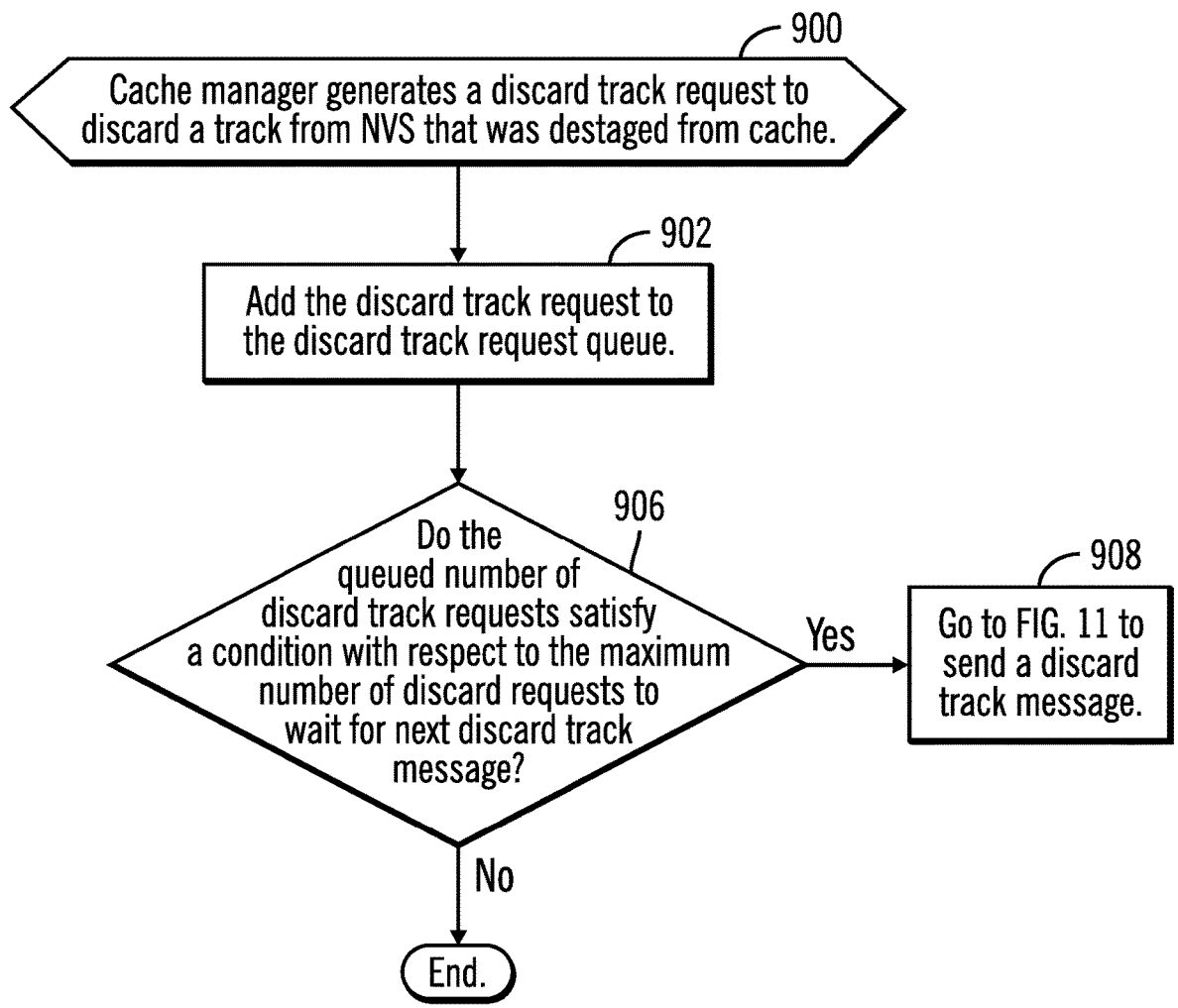
FIG. 9 illustrates an embodiment of operations to process a discard track request.

FIG. 9 illustrates an embodiment of operations performed by the cache manager 208 to process a discard track request generated to discard a track from the NVS 214 in the other node $200_j$ in response to destaging a track from the cache 210. Upon generating a discard track request, the cache manager 208 adds (at block 902) the discard track request to the discard track request queue 216. If (at block 906) the queued number of discard track requests in the queue 216 satisfies a condition, e.g., equality, with respect to the maximum number of discard requests to wait 504 before sending a message 700, then control proceeds (at block 908) to FIG. 11 to send a discard track message 700. Otherwise, if the queued number of discard track requests is less than the maximum number of discard requests 504, then control ends.

With the embodiment of FIG. 9, a discard track message 700 is sent if the queued number of requests is at least the maximum 504 to ensure that a message is sent at a frequency determined by the queue depth to optimize message sending operations.

Figure 10:
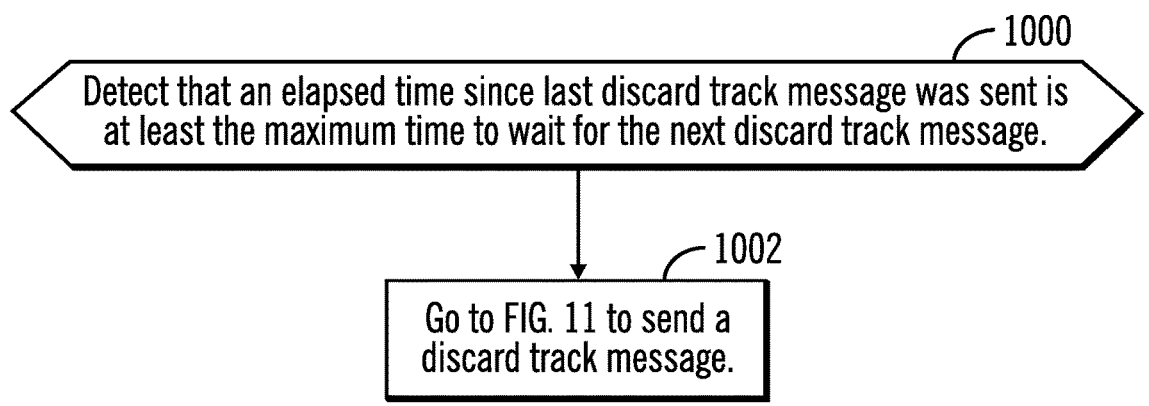
FIG. 10 illustrates an embodiment of operations upon detecting that an elapsed time since the last discard track message satisfies a condition.

FIG. 10 illustrates an embodiment of operations performed by the cache manager 208 upon detecting an elapsed time since the last discard track message was sent, e.g., the current timestamp 602 minus the timestamp of last sent message 604, is at least the maximum time to wait 502 to send a discard track message. If (at block 1000) this maximum time to elapse has occurred, then control proceeds (at block 1002) to FIG. 11 to send a discard track message.

Figure 11:
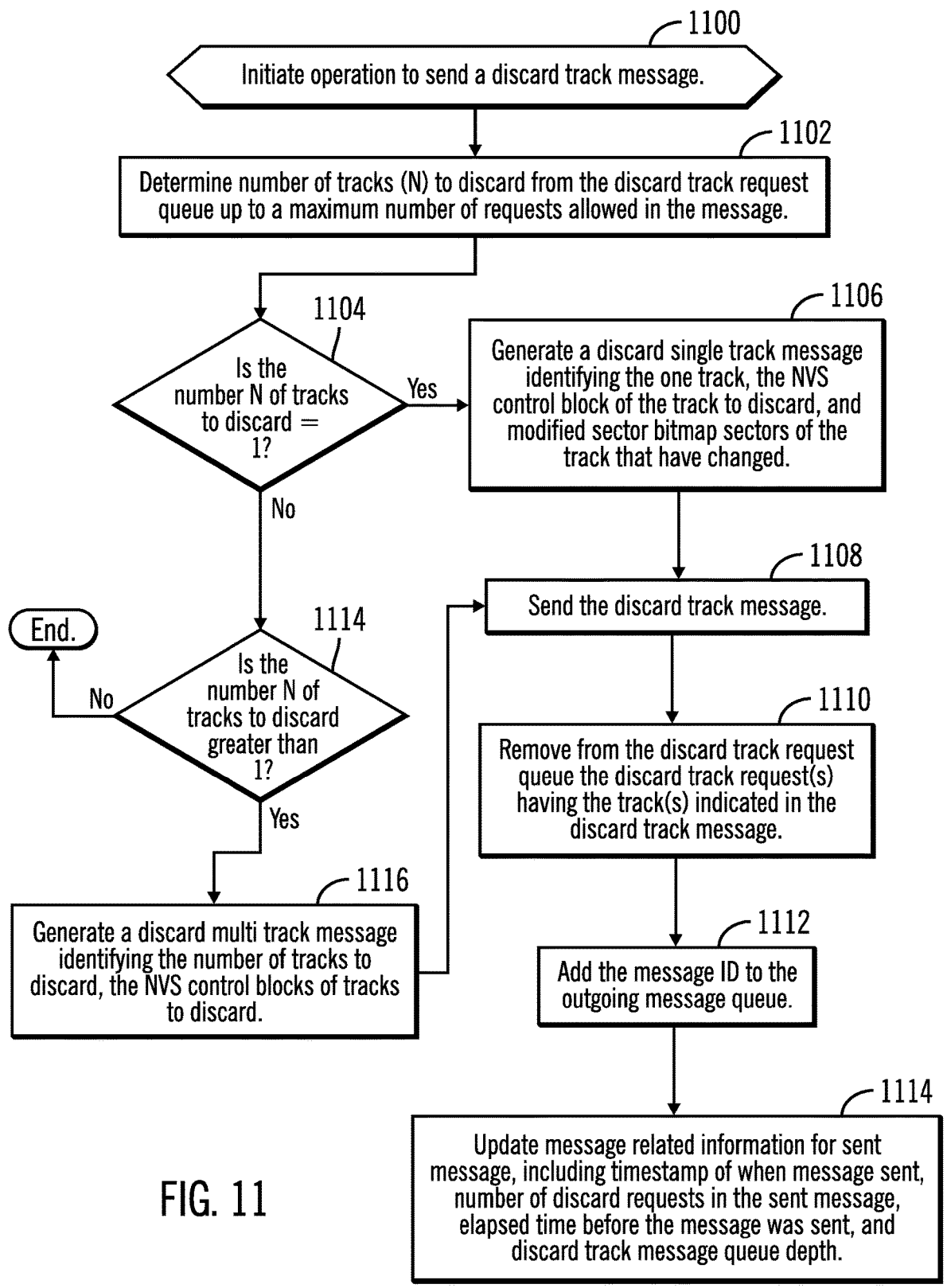
FIG. 11 illustrates an embodiment of operations to send a discard track message.

FIG. 11 illustrates an embodiment of operations performed by the cache manager 208 to send a discard track message 700, such as in response to the operations in FIGS. 9 and 10. Upon initiating (at block 1100) an operation to send the discard track message 700, the cache manager 208 determines (at block 1102) a number of tracks (N) to discard from the discard track request queue 216 up to a maximum number of requests 612 allowed in the message. If (at block 1104) the number N of tracks to discard is one, then the cache manager 208 generates (at block 1106) a discard single track message 700 for a single track identifying the track to discard in field 706, the NVS control block 704 of the track 706 to discard, and modified sector bitmap 708 of sectors of the track 706 that has changed in the cache 210. The discard track message 700 is sent (at block 1108) to the node $200_j$ having the NVS 214 including the track to discard. The discard track request included the track(s) included in the message 700 is removed (at block 1110) from the queue 216, and the message ID 702 of the sent message 700 is added (at block 1112) to the outgoing message queue 218. The message related information 600 concerning the just sent discard track message 700 are updated (at block 1114), including the timestamp of when message sent 604, number of discard requests in the sent message 606, elapsed time before the message was sent 608, and discard track message queue depth 614, updated at block 1110.

If (at block 1104) the number N of tracks to discard is not one and if (at block 1114) the number (N) of tracks to discard is not greater than one, i.e., is zero, then control ends. If it is greater than one, then the cache manager 208 generates (at block 1116) a discard multi track message 700 identifying the number of tracks to discard 706, the NVS control blocks of tracks to discard 704, and proceeds to block 1108 to send the message.

With the embodiment of FIG. 11, a discard track message 700 is generated to include up to the maximum number of discard track requests 612 that may be included in the message 700 which optimizes discard request operations, because including more tracks in fewer messages requires less processor utilization than using more messages to send fewer tracks. Further, because the discard track message 700 is sent in response to certain send message parameter values 500 being satisfied, the message is sent at a frequency based on an elapsed time and pending discard track requests that are optimized given the current message processing information 600 and statistics.

Figure 12:
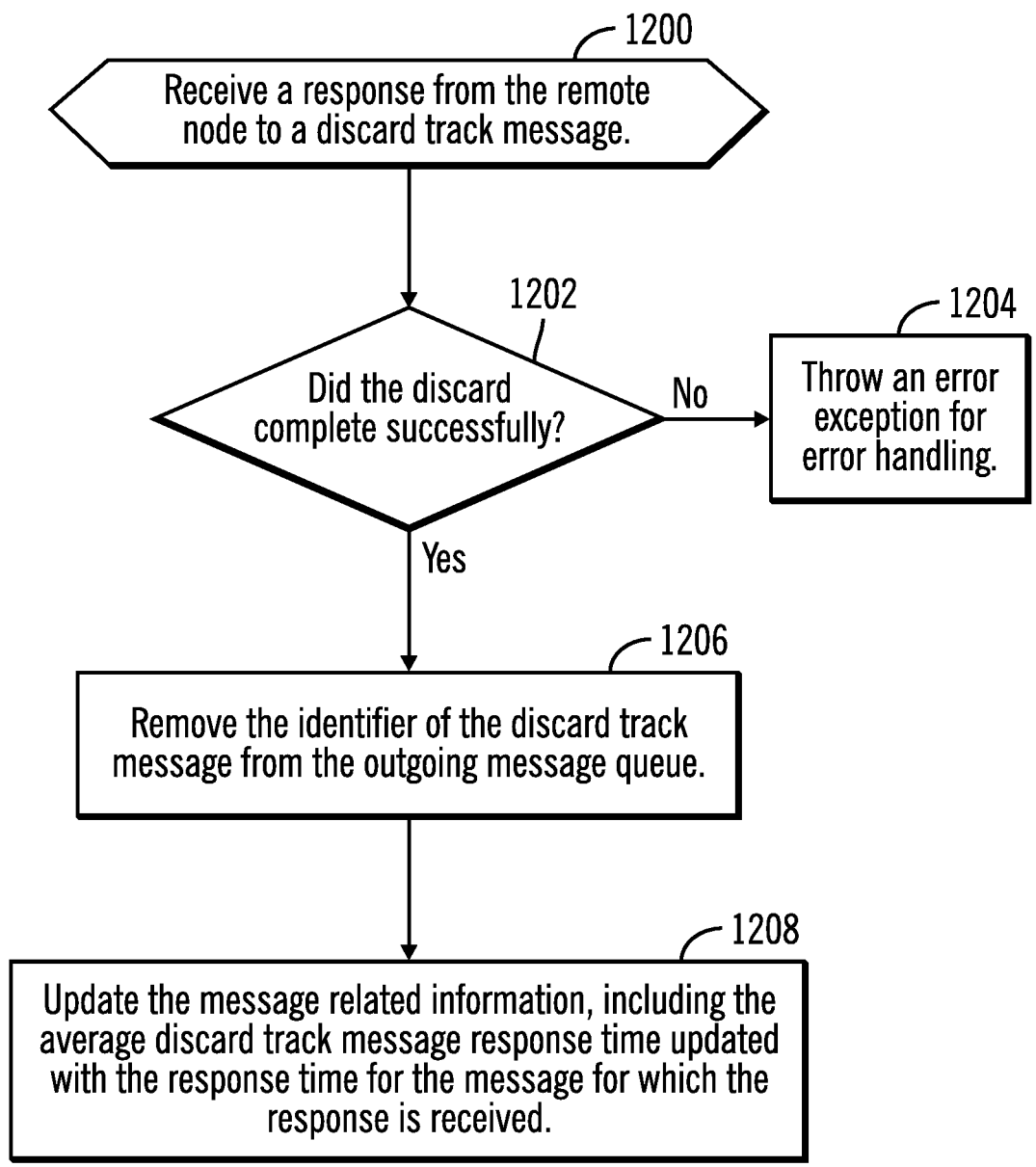
FIG. 12 illustrates an embodiment of operations to process a response to a discard track message.

FIG. 12 illustrates an embodiment of operations performed by the cache manager 208 in response to receiving a response to a discard track message indicated in the outgoing message queue 218. Upon receiving (at block 1200) the response, if (at block 1202) the discard at the NVS 214 did not complete successfully, then an error exception is thrown (at block 1204) for error handling. If (at block 1202) the discard did complete successfully, then the identifier of the completed message is removed (at block 1206) from the outgoing message queue 218 and the message related information 600 is updated (at block 1208) with new message statistics, such as updating the average discard track message response time 610 with the response time for the message for which the response is received.

With the embodiment of FIG. 12, the information used as input 222 to the machine learning module 220 is updated, such as the average discard track message response time 610, with real time information to keep the input 222 up-to-date and current to provide the most accurate information to the machine learning module 220 to best optimize the determination of the send message parameter values 500 used to determine the frequency for sending the discard track message 700.

Figure 13A:
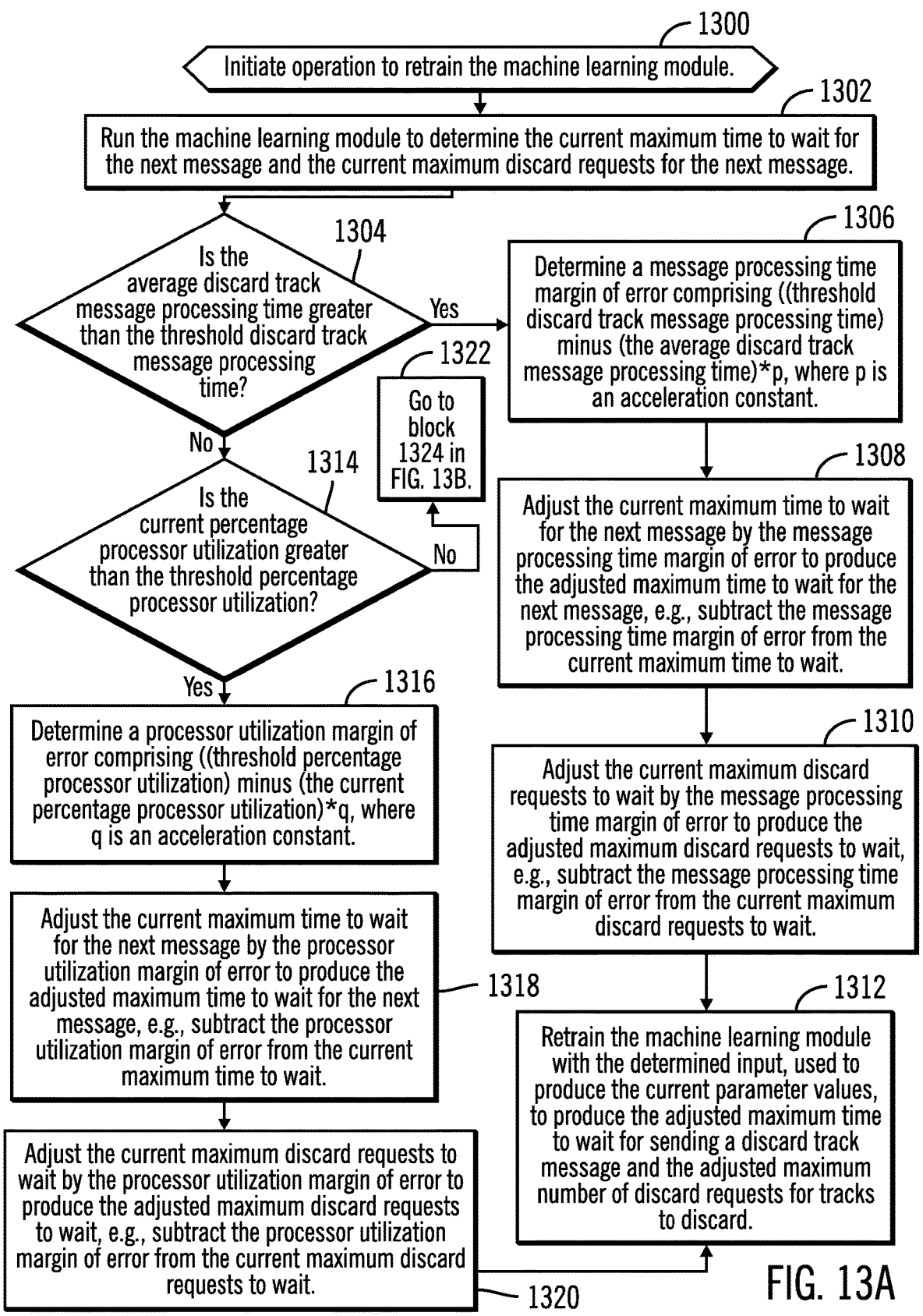
FIGS. 13a and 13b illustrate an embodiment of operations to retrain the machine learning module to update the send message parameter values based on current message operating conditions.
Figure 13B:
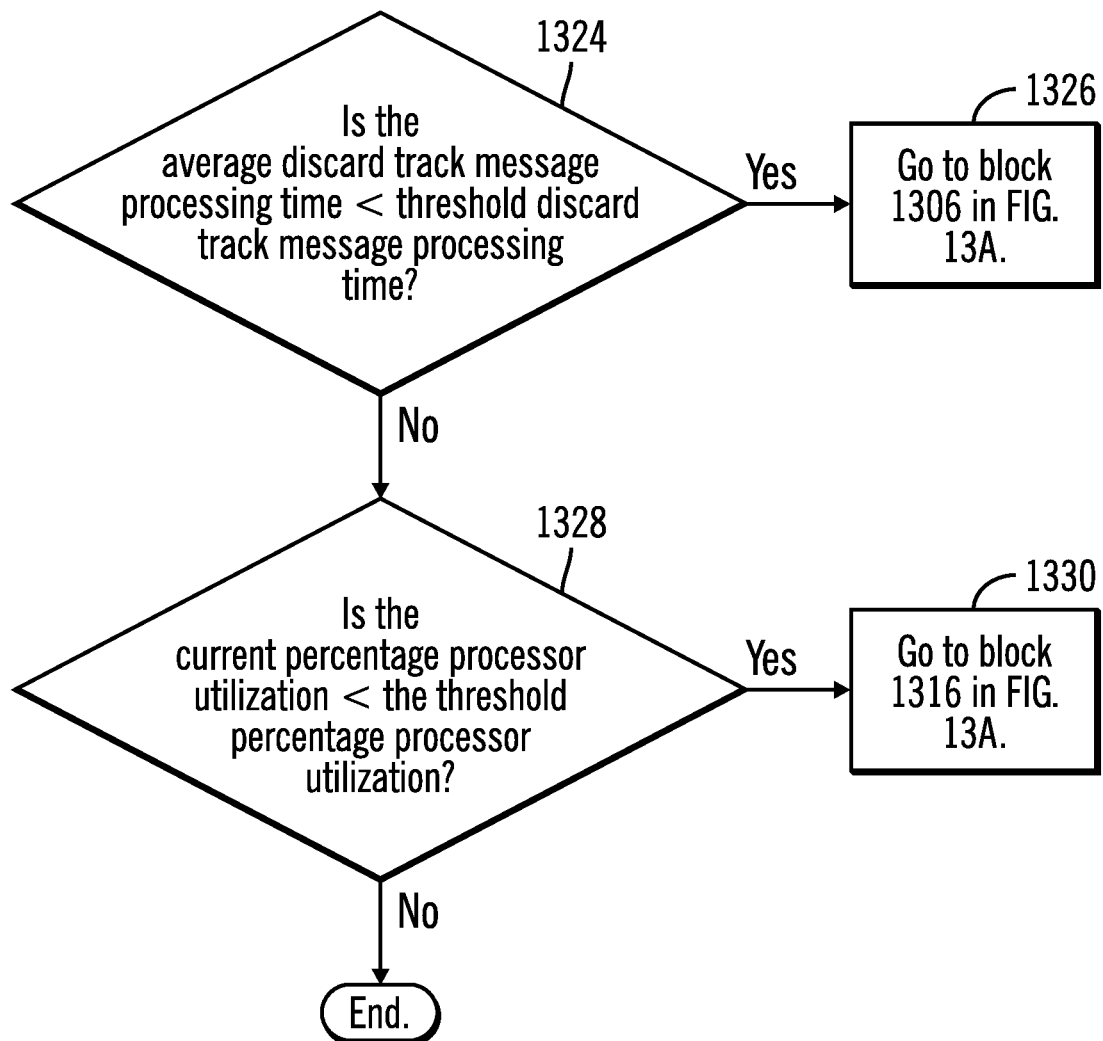

FIGS. 13a and 13b illustrate an embodiment of operations performed by the cache manager 208 and/or machine learning module 220 to retrain the machine learning module 220 to calculate the maximum time to wait to send a message 502 and the maximum number of discard requests 504 to optimize performance conditions for sending discard track messages, such as a discard track message processing time and processor utilization. The retraining operations of FIGS. 13a and 13b may be performed periodically at intervals or in response to an event. Upon initiating (at block 1300) the retraining operation, the machine learning module 220 is run (at block 1302) to determine the current maximum time to wait for the next message 502 and the current maximum discard requests for the next message 504. If (at block 1304) the average discard track message processing time 610 (a performance condition) is greater than a threshold discard track message processing time, then message processing is taking too long, which may be due to high processor utilization at the processor node 200$_j$ having the NVS 214. If (at block 1304) the average discard track message processing time 610 is greater than the threshold, then the machine learning module 220 (or cache manager 208) determines (at block 1306) a message processing time margin of error comprising the (threshold discard track message processing time) minus (the average discard track message processing time 610) times p, where p is an acceleration constant.

The current maximum time to wait for the next message 502 is adjusted (at block 1308) by the message processing time margin of error to produce the adjusted maximum time to wait for the next message, e.g., subtract the message processing time margin of error from the current maximum time to wait. The current maximum discard requests to wait 504 is adjusted (at block 1310) by the message processing time margin of error to produce the adjusted maximum discard requests to wait for the next message, e.g., subtract the message processing time margin of error from the current maximum discard requests to wait. In this way, if the average discard track message processing time 610 is relatively high with respect to the threshold, then the frequency of sending the discard track message 700 is reduced by increasing the maximum time to wait for the next message 502 and increasing the maximum discard requests to wait 504 to send the message.

The machine learning module 220 is retrained (at block 1312) with the determined input 222 to produce the adjusted maximum time to wait for sending a discard track message 224 and the adjusted maximum number of discard requests for tracks to discard 226.

If (at block 1304) the average discard track message processing time does not exceed the threshold, then a determination is made (at block 1314) whether the current percentage processor utilization, as determined from the processor 202 of the local node 200$_i$ sending the discard track message, is greater than a threshold percentage processor utilization. If (at block 1314) the current processor utilization is greater than the threshold, then a determination is made (at block 1316) of a processor utilization margin of error comprising the (threshold percentage processor utilization) minus (the current percentage processor utilization) times q, where q is an acceleration constant.

The current maximum time to wait for the next message 502 is adjusted (at block 1318) by the processor utilization margin of error to produce the adjusted maximum time to wait for the next message, e.g., subtract the processor utilization margin of error from the current maximum time to wait. The current maximum discard requests to wait 504 is adjusted (at block 1320) by the processor utilization margin of error to produce the adjusted maximum discard requests to wait for the next message, e.g., subtract the message processing time margin of error from the current maximum discard requests to wait. In this way, if the processor utilization is relatively high, then the processor utilization margin of error is negative, which reduces the frequency of sending the discard track message 700 by increasing the maximum time to wait for the next message 502 and the maximum discard requests to wait 504 to send the message. Control proceeds to block 1312 to retrain the machine learning module 220 to produce these adjusted parameters 224 and 226.

If (at block 1314) the current processor utilization is not greater than the threshold, then control proceeds (at block 1322) to block 1324 in FIG. 13b.

At block 1324, if the average discard track message processing time 610 does not exceed the threshold, then control proceeds (at block 1326) to block 1306 in FIG. 13a to increase the frequency of sending discard track messages. If (at block 1324) the average track message processing time is not less than the threshold discard track message processing time, then a determination is made (at block 1328) whether the current percentage processor utilization, as determined from the processor 202 of the local node 200$_i$ sending the discard track message, is less than a threshold percentage processor utilization. If (at block 1328) the current processor utilization is less than the threshold, then control proceeds (at block 1330) to block 1316 in FIG. 13a

With the embodiments of FIGS. 13a and 13b, if the nodes 200$_i$, 200$_j$ are over utilized, as indicated by the average discard track message time and processor utilization exceeding thresholds, then the frequency of sending the discard track messages is reduced by increasing the current maximum time to wait for the next message 502 and/or increasing the maximum discard requests to wait 504 to send the message. Reducing the frequency of sending the discard track messages reduces processing resources directed to generating and processing the discard track messages. If the processor nodes 200$_i$, 200$_j$ are not overburdened, then the message frequency can be increased to reduce latency in completing the discarding of tracks from the NVS 214 to free space faster in the NVS 214 and complete the destage operation faster.

The described embodiments provide a dynamic technique for determining the frequency at which discard track messages by increasing the maximum time to wait for the next message 502 and the maximum discard requests to wait 504 to reduce the frequency of sending messages if message response time is slow or the nodes 200$_i$, 200$_j$ have high utilization and higher latency. The frequency of sending messages is increased if the node processor utilization would permit more frequent message processing to generate, send and execute the discard track messages.

In the described embodiment, variables i, j, m, n, etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 14:
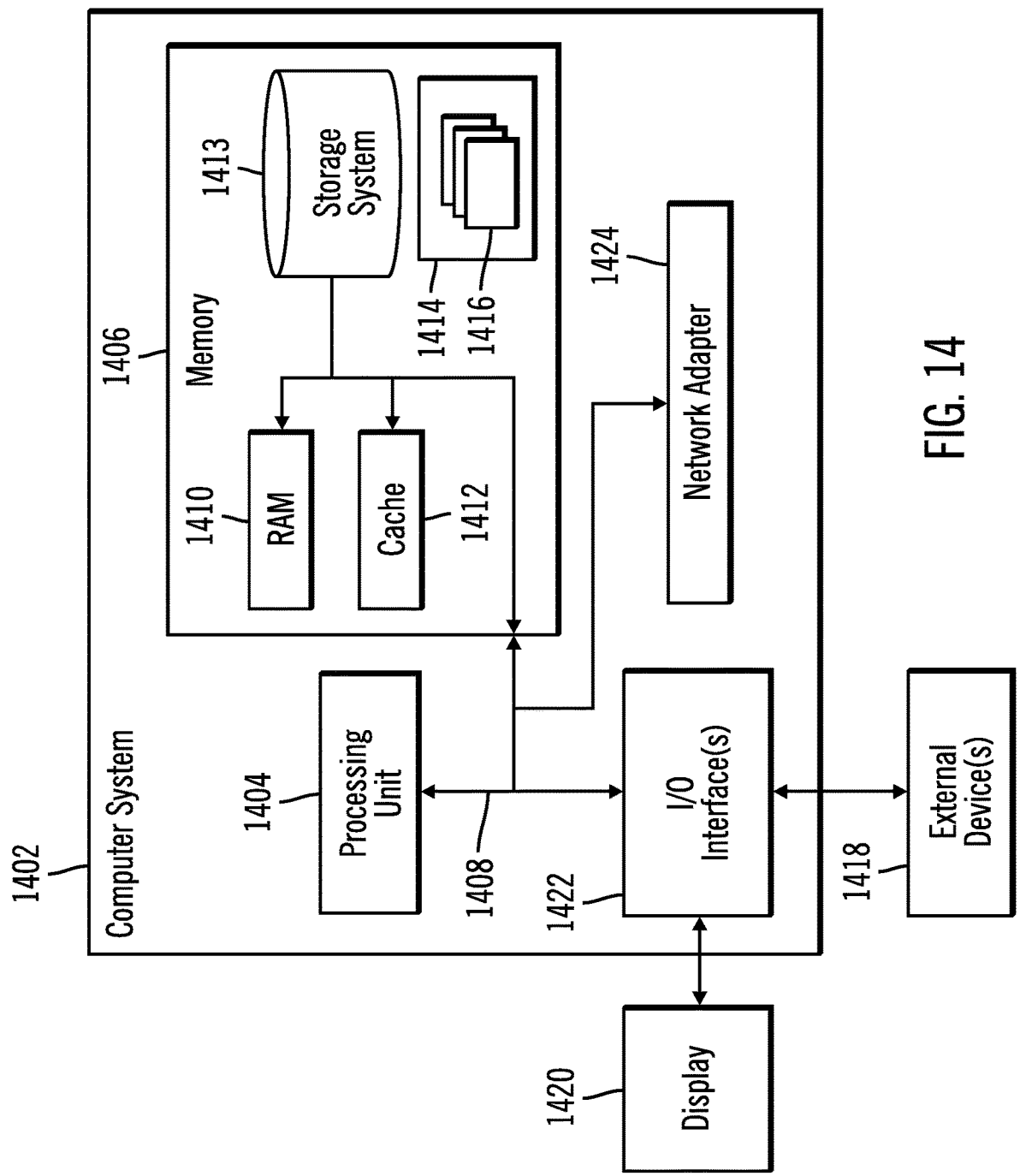
FIG. 14 illustrates a computing environment in which the components of FIGS. 1 and 2 may be implemented.

The computational components of FIGS. 1 and 2, including the storage controller 100, host 108, and processing nodes $200_1$, $200_2$, $200_i$, $200_j$ may be implemented in one or more computer systems, such as the computer system 1402 shown in FIG. 14. Computer system/server 1402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, the computer system/server 1402 is shown in the form of a general-purpose computing device. The components of computer system/server 1402 may include, but are not limited to, one or more processors or processing units 1404, a system memory 1406, and a bus 1408 that couples various system components including system memory 1406 to processor 1404. Bus 1408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1402 typically includes a variety of computer system readable media. Such media may be any available media that is accessible by computer system/server 1402, and it includes both volatile and non-volatile media, removable and non-removable media.

System memory 1406 can include computer system readable media in the form of volatile memory, such as random access memory (RAM) 1410 and/or cache memory 1412. Computer system/server 1402 may further include other removable/non-removable, volatile/non-volatile computer system storage media. By way of example only, storage system 1413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1408 by one or more data media interfaces. As will be further depicted and described below, memory 1406 may include at least one program product having a set (e.g., at least one) of program modules that are configured to carry out the functions of embodiments of the invention.

Program/utility 1414, having a set (at least one) of program modules 1416, may be stored in memory 1406 by way of example, and not limitation, as well as an operating system, one or more application programs, other program modules, and program data. Each of the operating system, one or more application programs, other program modules, and program data or some combination thereof, may include an implementation of a networking environment. The components of the computer 1402 may be implemented as program modules 1416 which generally carry out the functions and/or methodologies of embodiments of the invention as described herein. The systems of FIG. 1 may be implemented in one or more computer systems 1402, where if they are implemented in multiple computer systems 1402, then the computer systems may communicate over a network.

Computer system/server 1402 may also communicate with one or more external devices 1418 such as a keyboard, a pointing device, a display 1420, etc.; one or more devices that enable a user to interact with computer system/server 1402; and/or any devices (e.g., network card, modem, etc.) that enable computer system/server 1402 to communicate with one or more other computing devices. Such communication can occur via Input/Output (I/O) interfaces 1422. Still yet, computer system/server 1402 can communicate with one or more networks such as a local area network (LAN), a general wide area network (WAN), and/or a public network (e.g., the Internet) via network adapter 1424. As depicted, network adapter 1424 communicates with the other components of computer system/server 1402 via bus 1408. It should be understood that although not shown, other hardware and/or software components could be used in conjunction with computer system/server 1402. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for sending a message to a computing node indicating a number of requested items to process at the computing node, wherein the computer program product comprises a computer readable storage medium having computer readable program code embodied therein that when executed performs operations, the operations comprising:
   maintaining tracks in a cache;
   providing to a machine learning module information related to sending of messages to the computing node to process copies of tracks in the cache at the computing node;
   receiving, from the machine learning module having processed the provided information, at least one of a maximum wait time to wait to send a message and a maximum number message of queued messages;
   queuing a message in a queue in response to processing a track in the cache, wherein the queued message indicates the track processed in the cache;
   determining at least one of whether a last time since a message was sent exceeds the maximum wait time and a number of queued messages exceeds the maximum number of queued messages; and
   sending a queued message to the computing node to process a copy of the track at the computing node indicated in the queued message in response to determining at least one of that the last time since the message was sent exceeds the maximum wait time and the number of queued messages exceeds the maximum number of queued messages.

2. The computer program product of claim 1, wherein the message comprises a discard track message sent to the computing node to discard a track from a non-volatile storage at the computing node in response to destaging the track from the cache to a storage, and wherein the information related to sending of messages to the computing node includes information related to sending of discard track messages to the computing node to discard tracks from the non-volatile storage.

3. The computer program product of claim 2, wherein the maximum wait time comprises a maximum time to wait for sending a discard track message and the maximum number of queued messages comprises a maximum number of discard track requests for tracks to discard from the non-volatile storage to include in the discard track message.

4. The computer program product of claim 3, wherein the information related to sending of discard track messages, provided to the machine learning module, comprises a plurality of:
   a timestamp when a last discard track message was sent;
   a current timestamp;
   a number of discard requests in a last sent discard track message;
   an elapsed time before the last sent discard track message was sent;
   an average discard track message response time during a time interval;
   a maximum number of discard requests to include in a discard track message; and
   a discard track message queue depth indicating sent discard track messages for which complete has not been returned.

5. The computer program product of claim 2, wherein the providing the information related to the sending of discard track messages to the machine learning module is performed in response to at least one of sending the discard track message and receiving a response to a discard track message.

6. The computer program product of claim 5, wherein the cache from which tracks are destaged is in a first computing node and wherein the computing node comprises a second computing node, wherein the sending of the discard track message is sent from the first computing node to the second computing node, and wherein the operations further comprise:
   receiving from the second computing node a response to a sent discard track message; and
   updating the information related to the sending of the discard track messages in response to receiving the response to the sent discard track message.

7. A system for sending a message to a computing node indicating a number of requested items to process at the computing node, comprising:
   a processor;
   a cache for maintaining tracks; and
   a computer readable storage medium having computer readable program code embodied therein that in response to execution by the processor performs operations, the operations comprising:
      providing to a machine learning module information related to sending of messages to the computing node to process copies of tracks in the cache at the computing node;
      receiving, from the machine learning module having processed the provided information, at least one of a maximum wait time to wait to send a message and a maximum number of queued messages;
      queuing a message in a queue in response to processing a track in the cache, wherein the queued message indicates the track processed in the cache;
      determining at least one of whether a last time since a message was sent exceeds the maximum wait time and a number of queued messages exceeds the maximum number of queued messages; and
      sending a queued message to the computing node to process a copy of the track at the computing node indicated in the queued message in response to determining at least one of that the last time since the message was sent exceeds the maximum wait time and the number of queued messages exceeds the maximum number of queued messages.

8. The system of claim 7, wherein the message comprises a discard track message sent to the computing node to discard a track from a non-volatile storage at the computing node in response to destaging the track from the cache to a storage, and wherein the information related to sending of messages to the computing node includes information on sending of discard track messages sent to the computing node to discard tracks from the non-volatile storage.

9. The system of claim 8, wherein the maximum wait time comprises a maximum time to wait for sending a discard track message and the maximum number of queued messages comprises a maximum number of discard track requests for tracks to discard from the non-volatile storage to include in the discard track message.

10. The system of claim 9, wherein the information related to sending of discard track messages, provided to the machine learning module, comprises a plurality of:
   a timestamp when a last discard track message was sent;
   a current timestamp;
   a number of discard requests in a last sent discard track message;
   an elapsed time before the last sent discard track message was sent;
   an average discard track message response time during a time interval;
   a maximum number of discard requests to include in a discard track message; and
   a discard track message queue depth indicating sent discard track messages for which complete has not been returned.

11. The system of claim 9, wherein the providing the information related to the sending of discard track messages to the machine learning module is performed in response to at least one of sending the discard track message and receiving a response to a discard track message.

12. The system of claim 11, wherein the cache from which tracks are destaged is in a first computing node and wherein the computing node comprises a second computing node, wherein the sending of the discard track message is sent from the first computing node to the second computing node, and wherein the operations further comprise:
   receiving from the second computing node a response to a sent discard track message; and
   updating the information related to the sending of the discard track messages in response to receiving the response to the sent discard track message.

13. A method for sending a message to a computing node indicating a number of requested items to process at the computing node, comprising:
   maintaining tracks in a cache;
   providing to a machine learning module information related to sending of messages to the computing node to process copies of tracks in the cache at the computing node;
   receiving, from the machine learning module having processed the provided information, at least one of a maximum wait time to wait to send a message and a maximum number of queued messages;
   queuing a message in a queue in response to processing a track in the cache, wherein the queued message indicates the track processed in the cache;
   determining at least one of whether a last time since a message was sent exceeds the maximum wait time and a number of queued messages exceeds the maximum number of queued messages; and
   sending a queued message to the computing node to process a copy of the track at the computing node indicated in the queued message in response to determining at least one of that the last time since the message was sent exceeds the maximum wait time and the number of queued messages exceeds the maximum number of queued messages.

14. The method of claim 13, wherein the message comprises a discard track message sent to the computing node to discard a track from a non-volatile storage at the computing node in response to destaging the track from the cache to a storage, and wherein the information related to sending of messages to the computing node includes information on sending of discard track messages sent to the computing node to discard tracks from the non-volatile storage.

15. The method of claim 14, wherein the maximum wait time comprises a maximum time to wait for sending a discard track message and the maximum number of queued messages comprises a maximum number of discard track requests for tracks to discard from the non-volatile storage to include in the discard track message.

16. The method of claim 15, wherein the information related to sending of discard track messages, provided to the machine learning module, comprises a plurality of:
   a timestamp when a last discard track message was sent;
   a current timestamp;
   a number of discard requests in a last sent discard track message;
   an elapsed time before the last sent discard track message was sent;
   an average discard track message response time during a time interval;
   a maximum number of discard requests to include in a discard track message; and
   a discard track message queue depth indicating sent discard track messages for which complete has not been returned.

17. The method of claim 14, wherein the providing the information related to the sending of discard track messages to the machine learning module is performed in response to at least one of sending the discard track message and receiving a response to a discard track message.

18. The method of claim 17, wherein the cache from which tracks are destaged is in a first computing node and wherein the computing node comprises a second computing node, wherein the sending of the discard track message is sent from the first computing node to the second computing node, further comprising:
   receiving from the second computing node a response to a sent discard track message; and
   updating the information related to the sending of the discard track messages in response to receiving the response to the sent discard track message.

* * * * *